Nov. 24, 1964     J. R. OISHEI     3,158,293
WINDSHIELD WASHER
Filed Feb. 17, 1961
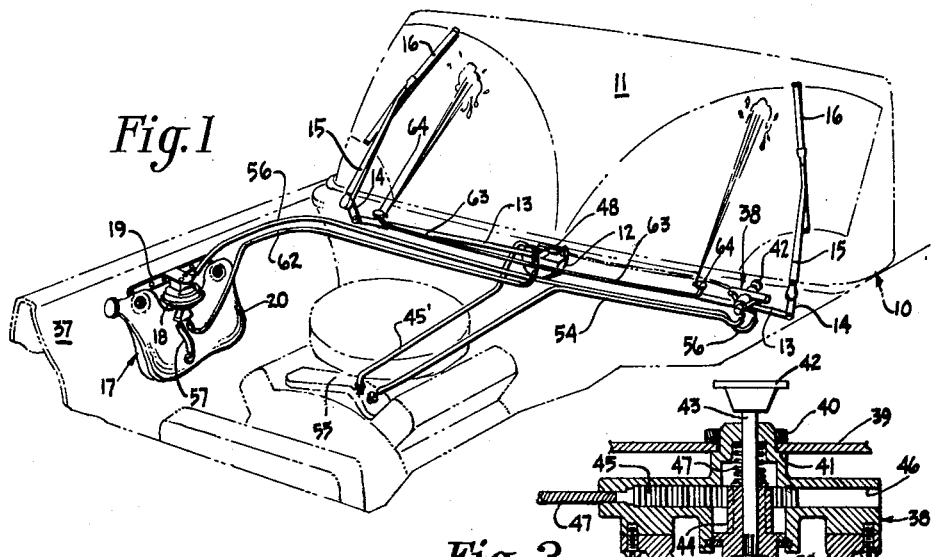
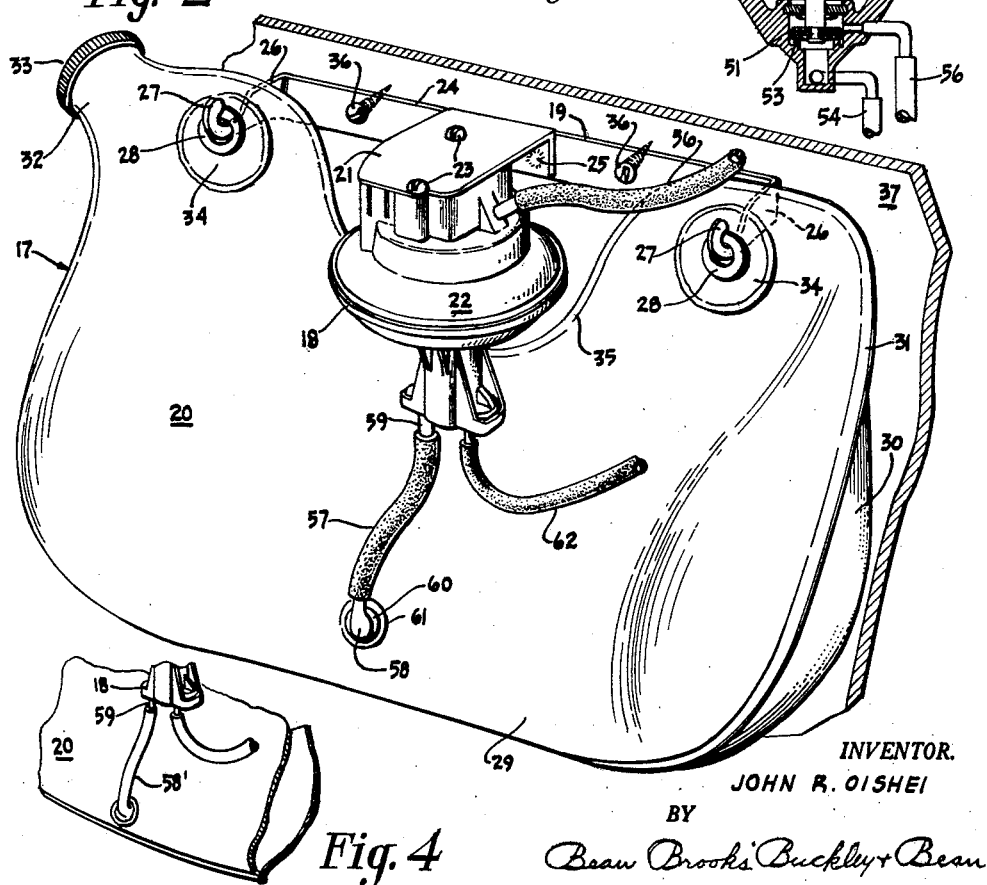
INVENTOR.
JOHN R. OISHEI
BY
Bean Brooks Buckley + Bean.
ATTORNEYS.

3,158,293
WINDSHIELD WASHER
John R. Oishei, Buffalo, N.Y., assignor to Trico
Products Corporation, Buffalo, N.Y.
Filed Feb. 17, 1961, Ser. No. 89,974
4 Claims. (Cl. 222—180)

The present invention relates to a windshield washer and more particularly to an improved arrangement for mounting certain components thereof.

It is one object of the present invention to provide an arrangement for mounting a windshield washer pump and a detachable solvent reservoir in a manner that inadvertent separation of the reservoir is virtually impossible while intentional separation of the solvent reservoir from its mounting can be effected simply without the use of tools.

Another object of the present invention is to provide a windshield washer assembly wherein the washer pump and reservoir therefor may be assembled as a unit on a bracket which, in turn, is adapted to be mounted in position on a vehicle, thereby eliminating the necessity for separately mounting the various components of the washer system and, in turn, thereby saving labor and materials.

Another object of the present invention is to provide a control for a windshield clearing system which causes the wiper motor to start in response to a simple turning action of a control knob, and permits selective operation of a washer pump in response to a pulling action on said control knob which accompanies said turning manipulation. Other objects and attendant advantages of the present invention will readily be perceived hereafter.

In accordance with the present invention, the windshield washer combination includes a bracket which mounts both a washer pump and a reservoir therefor of a flexible knapsack type. In its installed condition on the wall of a vehicle, the bracket causes the flexible knapsack to lie between the wall of the vehicle and a portion of the pump, with a portion of the bracket also overlying the reservoir to effect the foregoing orientation. The pump and the reservoir both extend downwardly from the bracket. Thus in the event the vehicle on which the washer unit is mounted is subjected to excessive jarring, the washer pump acts as a means for preventing the reservoir from becoming detached from the bracket. The reservoir is mounted on the bracket by means of a hook and eye connection, the eyes being formed by grommets or eyelets installed in suitable apertures in the flexible reservoir, and the hooks being part of the bracket. Thus not only does the orientation between the wall of the vehicle, pump, and reservoir prevent detachment of the reservoir, as noted above, but the hook and eye connection permits ready removal of the reservoir for purposes of replacement. The washer unit comprising the reservoir, bracket, and pump is assembled as a unit and is intended to be installed as a unit. In this respect the reservoir is cut away in the vicinity of the pump to permit sheet metal screws or the like to be inserted into suitable apertures in the bracket for mounting the unit on the wall of the vehicle. In other words, there is a cutaway portion of the reservoir which permits the screws, or the like, which mount the bracket on the wall of the vehicle to be manipulated without interference from any portion of the washer unit. The foregoing features of the washer unit of the present invention permit it to be installed in a simple manner with a minimum of labor and further, once the washer unit comprising the pump, bracket, and reservoir are installed, any or all of the components may be removed for simple replacement, and the pump unit is so oriented relative to the reservoir so as to prevent its inadvertent detachment from the bracket, notwithstanding that the reservoir is mounted on the bracket by a hook and eye connection which permits it to be removed for replacement, or the like, without tools.

Another aspect of the present invention is to provide a highly simplified and effective control for providing either sole wiper motor operation or operation of the windshield washer pump jointly therewith. In this respect a control is provided having a knob which may be turned to turn the wiper motor on, and again turned to turn the wiper motor off. However, if washer operation is desired to accompany wiper motor operation, it is merely necessary to pull the knob in addition to turning it, and hold the knob in a pulled-out condition for as long as washer pump operation is desired. Joint washer and wiper motor operation will continue until the knob is released and the control will therefore terminate operation of the washer pump while permitting operation of the wiper motor to continue until the knob is turned to an off condition. Thus by the manipulation of a single knob either sole wiper motor operation or joint operation of the washer pump therewith may be obtained. The present invention will be more fully understood when the following portions of the specification are read in conjunction with the accompanying drawing wherein:

FIG. 1 is a fragmentary perspective view of an automotive vehicle mounting the improved washer unit of the present invention;

FIG. 2 is an enlarged perspective view showing the washer unit of the present invention mounted on a wall of the vehicle;

FIG. 3 is a plan view, partially in cross section, showing a control which may be utilized with the system in which the washer unit of the present invention is installed; and FIG. 4 is a fragmentary perspective view of an alternate type of reservoir.

In FIG. 1 an automotive vehicle 10 is shown having a windshield 11 moutned thereon in the usual manner. A windshield wiper motor 12 is suitably mounted on the fire wall of the vehicle and has links 13 coupled thereto which, in turn, are coupled to crank arms 14 fixedly secured to rockshafts (not shown) journaled in the cowl of the vehicle. The rockshafts mount wiper arms 15 which, in turn, mount wipers 16. As is well understood in the art, when wiper motor 12 is placed in operation, wiper 16 will oscillate back and forth across the windshield to clear moisture therefrom.

The washer unit 17 of the present invention comprises a washer pump 18, a bracket 19, and a flexible knapsack reservoir 20. The washer pump 18 may be identical to the pump fully disclosed in application Serial No. 72,466, now U.S. Patent No. 3,097,608, except that its closure or cover 21 which is secured to the body portion 22 thereof by screws 23 is a portion of bracket 19, cover or closure 21 being secured to extended portion 24 of pump closure bracket 19 as by a plurality of welds 25. The outer ends of pump closure bracket 19 are formed into arms 26 and extend substantially perpendicular to extended portion 24. Arms 26 are shaped into hook like portions 27 which are received in metallic grommets or eyelets 28 secured in suitable apertures (not numbered) in reservoir 20.

Flexible knapsack reservoir 20 is fabricated essentially of two sheets 29 and 30 of plastic composition material which are heat sealed at their juncture 31. A stiff grommet or collar (not shown) is located on the inside of neck 32 and is suitably tapped for receiving threaded cap 33 which is removed when filling of reservoir 20 is required. It is to be understood that the threaded and tapped connection for securing cap 33 encompasses both the conventional threading and tapping as well as a simple type of connection including a projection on the cap and a slot in the collar, or vice versa. Both sheets 29 and 30 of plastic composition material which form the sides of the flexible knapsack are heat sealed at 34 in the areas surrounding grommets 28 to thereby form a reinforced portion for carrying the grommets or eyelets as well as for preventing leakage in this area. Reservoir 20 is cut away in the area 35 lying between arm 26, as shown in FIG. 2. This construction prevents the knapsack 20 from rubbing on washer pump 18 while the vehicle is moving, and thereby eliminates the possibility of premature reservoir failure. Furthermore, since the knapsack 20 is cut away in the area 35 noted above, sheet metal screws 36, or the like, may easily be inserted in suitable apertures (not numbered) in extended portion 24 of bracket 19 and screwed into the wall 37 of the engine compartment while the washer unit comprising pump 18, bracket 19, and reservoir 20 are assembled without there being any interference to such manipulation of the screws.

It will be noted that flexible reservoir 20 lies between wall 37 and a portion of pump 18, and that this arrangement is produced by the fact that pump cover 21 overlies reservoir 20. Because of the foregoing orientation, in the event that the vehicle is jarred excessively, the pump acts as a retainer to maintain reservoir 20 in position and prevent it from becoming detached from the bracket in the areas of hooks 27 and grommets 28. However, notwithstanding the foregoing provision against inadvertent separation of reservoir 20, grommets 28 may be manually removed from hooks 27 very simply without the use of tools in the event that replacement of reservoir 20 is required.

A control 38 (FIGS. 1 and 3) is mounted on the vehicle dashboard 39 as by a tapped sleeve 40 coacting with shoulder 41 of control housing 38 to hold the dashboard 39 therebetween. In the event that a windshield washing action is desired, the vehicle operator need merely pull knob 42 toward him and simultaneously rotate it in a counterclockwise direction when viewed in FIG. 1. This will cause shaft 43, which is fixedly secured in gear 44, to rotate and cause rack 45 to move to the right in groove 46. Flexible cable 47 has one end thereof secured to rack 45 and the other end thereof secured to wiper motor slide valve 48. Thus rotation of knob 42 will place the wiper motor 12 in operation. Wiper motor 12 is of the vacuum type and is suitably connected to a source of vacuum such as the intake manifold by conduit 45′, it being undestood that the movement of the slide valve will permit the communication between the internal mechanism of the vacuum motor and the vacuum source and thus cause the motor to operate. In order to cause simultaneous operation of the washer pump 18 with the actuation of the motor, the vehicle operator, in addition to rotating knob 42 in the above-noted manner, also pulls it toward him (upwardly in FIG. 3). This causes gear 44 affixed to shaft 43 to move upwardly against the bias of spring 47, it being understood that the teeth of gear 44 can move in the foregoing manner relative to the teeth on rack 45. A valve stem 48 has its T-shaped head 49 loosely mounted within the end 50 of gear 44 so that when knob 42 is moved upwardly in FIG. 3, a valve 51 on stem 48 will move off of its seat 53 to permit communication between conduit 54 coming from the intake manifold 55 of the vehicle and conduit 56 (FIGS. 1, 2, and 3) in communication with washer pump 18. As long as knob 42 is held outwardly against the bias of spring 47, the communication between the intake manifold 55 and pump 18 in the above-described manner will cause the pump to provide a series of intermittent squirts of solvent. When knob 42 is released, spring 47 (FIG. 3) will expand and cause valve 51 to terminate communication between conduits 54 and 56 and such action will cause pump 18 to stop operating. It can thus be appreciated that the duration of solvent projection is determined by the vehicle operator who may hold knob 42 in its pulled-out condition as long as he desires. However, when knob 42 is released so that valve 51 closes, the wiper motor cable 47 will still remain in a position wherein it causes the wiper motor to operate. The vehicle operator may leave the wiper motor in operation for the period required for the wipers 16 to dry the windshield and thereafter the vehicle operator rotates knob 42 in a clockwise direction when viewed from FIG. 1. This will cause rack 45 to return to the position shown in FIG. 3 and cause corresponding movement of the motor slide valve 48 to cause motor 12 to park, as is well known.

If the operation of the wiper motor is desired independently of the washer pump 18, knob 42 is manipulated in the same manner noted above except that it is not pulled out to permit communication between the vacuum source and the washer pump 18.

When the washer pump 18 is in operation it obtains its solvent from reservoir 20 through conduit 57 having one end thereof mounted on fitting 58 and the other end thereof mounted on nipple 59 of pump 18. Fitting 58 has its outer flattened edges 60 secured in the wall 29 of the reservoir by a heat sealing connection 61. After the solvent is drawn from reservoir 20 through conduit 57 by pump 18, it is expelled into conduit 62 which is in communication with conduits 63 leading to nozzles 64.

An alternate type of connection between the washer pump 18 and reservoir 20 is shown in FIG. 4 wherein the conduit 57 of FIG. 2 has been eliminated and while fitting 58′ has the same connection noted above with respect to the reservoir as does fitting 58 of FIG. 2, it is molded with a conduit portion integrally therewith for attachment to nipple 59 of pump 18.

While preferred embodiments of the present invention have been disclosed, it is to be understood that the present invention is not limited thereto, but may be otherwise embodied within the scope of the following claims.

What is claimed is:

1. A windshield washer combination comprising a pump having a combined closure and bracket, an extended portion forming a part of said closure, means adapted to be secured to said extended portion for securing said pump on the wall of a vehicle, a reservoir of the flexible knapsack type having an upper portion and a lower portion, means on said extended portion adapted to be secured to said upper portion of said reservoir to mount said reservoir, said washer pump and said reservoir both extending downwardly from said combined closure and bracket, a portion of said reservoir being positioned between said wall and said pump, and conduit means fastened between said pump and said lower portion of said reservoir for conveying washer solvent to said pump, said reservoir also lying between said wall of said vehicle and said conduit means whereby the positioning of said reservoir between said wall of said vehicle and said pump and the attachment between said pump and said reservoir through said conduit means assists in maintaining said reservoir stabilized in mounted position on said bracket.

2. A windshield washer combination comprising a washer pump, a bracket, first means on said bracket for attachment to said washer pump, second means on said bracket for mounting said bracket on the wall of a vehicle, a reservoir of the knapsack type having an upper portion and a lower portion, eyelets in said upper portion of said reservoir, third means on said bracket for insertion into said eyelets for mounting said reservoir on said bracket, said first means being joined to said second means by a portion of said bracket which overlies said reservoir, said reservoir and said pump extending downwardly from said bracket, said reservoir being positioned between said wall of said vehicle and a portion of said pump, conduit means extending between said pump and said lower portion of said reservoir for conducting solvent to said pump, said overlying portion of said bracket by effecting the positioning of said reservoir between said wall of said vehicle and said pump preventing said reservoir from becoming inadvertently detached from said bracket.

3. A windshield washer combination adapted to be secured as a unit to a wall of a vehicle comprising a washer pump, a bracket, first means on said bracket for attachment to said washer pump, a reservoir of the flexible knapsack type having an upper portion and a lower portion, eyelets in said upper portion of said reservoir, second means on said bracket for insertion into said eyelets for mounting said reservoir on said bracket, conduit means extending between said pump and said lower portion of said reservoir for conducting solvent to said pump, said reservoir having a cutaway portion in the area of said pump to prevent interference between said pump and said reservoir in their normal mounted positions, and means on said bracket in the vicinity of said cutaway portion of said reservoir for receiving fastening means for fastening said bracket to the wall of a vehicle, said cutaway portion permitting said attachment to be effected while said pump, reservoir, and bracket are mounted as a unit in operative relation to each other.

4. A windshield washer combination comprising a washer pump, a bracket, first means on said bracket for attachment to said washer pump, second means on said bracket for mounting said bracket on the wall of a vehicle, a reservoir of the flexible knapsack type having an upper portion and a lower portion, eyelets in said upper portion of said reservoir, third means on said bracket for insertion into said eyelets for mounting said reservoir on said bracket, said first means being joined to said second means so as to orient said reservoir between said vehicle wall and a portion of said washer pump, conduit means extending between said pump and said lower portion of said reservoir for conducting said solvent to said pump, said positioning of said reservoir between said wall of said vehicle and said pump preventing said reservoir from becoming inadvertently detached from said bracket.

References Cited in the file of this patent
UNITED STATES PATENTS

| | | |
|---|---|---|
| 1,974,073 | Kimball | Sept. 18, 1934 |
| 2,206,815 | Horton | July 2, 1940 |
| 2,668,637 | Gilmore | Feb. 9, 1954 |
| 2,743,473 | Oishei | May 1, 1956 |
| 2,797,131 | Parkes | June 25, 1957 |
| 2,877,486 | Deibel et al. | Mar. 17, 1959 |